(12) United States Patent
Moore

(10) Patent No.: US 8,976,128 B2
(45) Date of Patent: Mar. 10, 2015

(54) USING PRESSURE DIFFERENCES WITH A TOUCH-SENSITIVE DISPLAY SCREEN

(75) Inventor: Stephen C. Moore, Austin, TX (US)

(73) Assignee: Google Technology Holdings LLC, Mountain View, CA (US)

( * ) Notice: Subject to any disclaimer, the term of this patent is extended or adjusted under 35 U.S.C. 154(b) by 648 days.

(21) Appl. No.: 13/230,224

(22) Filed: Sep. 12, 2011

(65) Prior Publication Data

US 2013/0063364 A1 Mar. 14, 2013

(51) Int. Cl.
*G06F 3/041* (2006.01)
*G06F 3/0488* (2013.01)

(52) U.S. Cl.
CPC .......... *G06F 3/04883* (2013.01); *G06F 3/0416* (2013.01)
USPC ....................................... 345/173

(58) Field of Classification Search
USPC .................................. 345/174, 173
See application file for complete search history.

(56) References Cited

U.S. PATENT DOCUMENTS

| | | | |
|---|---|---|---|
| 5,475,401 A | 12/1995 | Verrier et al. | |
| 6,414,674 B1 | 7/2002 | Kamper et al. | |
| 6,504,530 B1 | 1/2003 | Wilson et al. | |
| 6,509,847 B1 | 1/2003 | Anderson | |
| 6,856,259 B1 * | 2/2005 | Sharp | 341/5 |
| 7,629,966 B2 | 12/2009 | Anson | |
| 7,698,084 B2 | 4/2010 | Soss | |
| 7,777,730 B2 | 8/2010 | Geurts et al. | |
| 7,924,143 B2 | 4/2011 | Griffin et al. | |
| 7,952,566 B2 | 5/2011 | Poupyrev et al. | |
| 8,243,035 B2 | 8/2012 | Abe et al. | |
| 8,344,883 B2 | 1/2013 | Ujii et al. | |
| 8,508,494 B2 * | 8/2013 | Moore | 345/173 |

(Continued)

FOREIGN PATENT DOCUMENTS

| | | | |
|---|---|---|---|
| JP | 2010157268 A | 7/2010 | |
| WO | 9736225 A1 | 10/1997 | |

(Continued)

OTHER PUBLICATIONS

Miyaki, Takasi et al.: "GraspZoom: zooming and scrolling control model for single-handed mobile interaction", MobileHCI '09 Proceedings of the 11th International Conference on Human-Computer Interaction with Mobile Devices and Services, Sep. 15-18, 2009, Bonn, Germany, ISBN: 978-1-60558-281-8, all pages.

(Continued)

*Primary Examiner* — Fred Tzeng
(74) *Attorney, Agent, or Firm* — Shumaker & Sieffert, P.A.

(57) ABSTRACT

Disclosed is a user interface that responds to differences in pressure detected by a touch-sensitive screen. The user selects one type of user-interface action by "lightly" touching the screen and selects another type of action by exerting more pressure. Embodiments can respond to single touches, to gestural touches that extend across the face of the touch-sensitive screen, and to touches in which the user-exerted pressure varies during the course of the touch. Some embodiments respond to how quickly the user changes the amount of pressure applied. In some embodiments, the location and pressure of the user's input are compared against a stored gesture profile. Action is taken only if the input matches "closely enough" to the stored gesture profile. In some embodiments, a notification is sent to the user when the pressure exceeds a threshold between a light and a heavy press.

22 Claims, 9 Drawing Sheets

(56) References Cited

U.S. PATENT DOCUMENTS

| | | | |
|---|---|---|---|
| 8,587,542 B2* | 11/2013 | Moore | 345/173 |
| 2002/0015064 A1 | 2/2002 | Robotham et al. | |
| 2002/0157880 A1 | 10/2002 | Atwood et al. | |
| 2003/0063073 A1 | 4/2003 | Geaghan et al. | |
| 2005/0110769 A1 | 5/2005 | DaCosta et al. | |
| 2006/0132455 A1 | 6/2006 | Rimas-Ribikauskas et al. | |
| 2006/0132456 A1 | 6/2006 | Anson | |
| 2008/0158185 A1 | 7/2008 | Westerman | |
| 2008/0204427 A1* | 8/2008 | Heesemans et al. | 345/174 |
| 2008/0316183 A1 | 12/2008 | Westerman et al. | |
| 2009/0051667 A1 | 2/2009 | Park et al. | |
| 2009/0058830 A1 | 3/2009 | Herz et al. | |
| 2009/0237374 A1 | 9/2009 | Li et al. | |
| 2010/0017710 A1 | 1/2010 | Kim et al. | |
| 2010/0026647 A1 | 2/2010 | Abe | |
| 2010/0039393 A1* | 2/2010 | Pratt et al. | 345/173 |
| 2010/0057235 A1 | 3/2010 | Wang et al. | |
| 2010/0058251 A1 | 3/2010 | Rottler et al. | |
| 2010/0225604 A1 | 9/2010 | Homma et al. | |
| 2010/0277432 A1 | 11/2010 | Tsai | |
| 2011/0050394 A1* | 3/2011 | Zhang et al. | 340/5.82 |
| 2011/0050576 A1 | 3/2011 | Forutanpour et al. | |
| 2011/0050619 A1 | 3/2011 | Griffin | |
| 2011/0050629 A1 | 3/2011 | Homma et al. | |
| 2011/0283212 A1 | 11/2011 | Warner | |
| 2012/0306766 A1 | 12/2012 | Moore | |
| 2013/0063389 A1 | 3/2013 | Moore | |
| 2014/0028601 A1 | 1/2014 | Moore | |

FOREIGN PATENT DOCUMENTS

| | | | |
|---|---|---|---|
| WO | 2011019482 A1 | 2/2011 | |
| WO | 2011028944 A1 | 3/2011 | |

OTHER PUBLICATIONS

Blasko et al.: "Single-Handed Interaction Techniques for Multiple Pressure-Sensitive Strips", [Online], Published in the Extended Abstracts of the Conference on Human Factors in Computing Systems (CHI 2004), Apr. 24-29, 2004, pp. 1461-1464, Retrieved on Oct. 10, 2012, URL:<http://citeseerx.ist.psu.edu/viewdoc/download?doi=10.1.1.88.772&rep-rep1&type=pdf>.

Patent Cooperation Treaty, International Search Report and Written Opinion of the International Searching Authority for International Application No. PCT/US2012/051713, Oct. 23, 2012, 9 pages.

Moeller, Jon et al.: "ZeroTouch: A Zero-Thickness Optical Multi-Touch Force Field", Chi 2011, May 7-12, 2011, Vancouver, BC, Canada, ACM 978-1-45-3-0268-5—May 11, 2005, all pages.

Kim, Hong-Ki et al.: "Transparent and Flexible Tactile Sensor for Multi-Touch Screen Application with Force Sensing", Solid-State Sensors, Actuators and Microsystems Conference, 2009, Transucers 2009, Denver CO, USA, International, Jun. 21-25, 2009, E-ISBN: 978-1-4244-4103-8, pp. 1146-1149.

Patent Cooperation Treaty, "PCT Search Report and Written Opinion of the International Searching Authority" for International Application No. PCT/US2012/052612 dated Nov. 6, 2012, 9 pages.

Patent Cooperation Treaty, "PCT Search Report and Written Opinion of the International Searching Authority" for International Application No. PCT/US2012/036208 dated Oct. 31, 2012, 15 pages.

Prosecution History from U.S. Appl. No. 13/230,301, dated Mar. 20, 2014 through Jun. 25, 2014, 28 pp.

Prosecution History from U.S. Patent No. 8,508,494, dated Jun. 12, 2013 through Jul. 16, 2013, 11 pp.

Prosecution History from U.S. Patent No. 8,587,542, dated Jun. 20, 2013 through Oct. 26, 2013, 24 pp.

Prosecution History from U.S. Appl. No. 14/042,911, dated Oct. 1, 2013 through Dec. 23, 2013, 21 pp.

Response to Office Action dated Jun. 25, 2014, from U.S. Appl. No. 13/230,301, filed on Sep. 24, 2014, 13 pp.

Notice of Preliminary Rejection from Korean Application No. 10-2014-7006443, issued Dec. 2, 2014 7 pp.

* cited by examiner

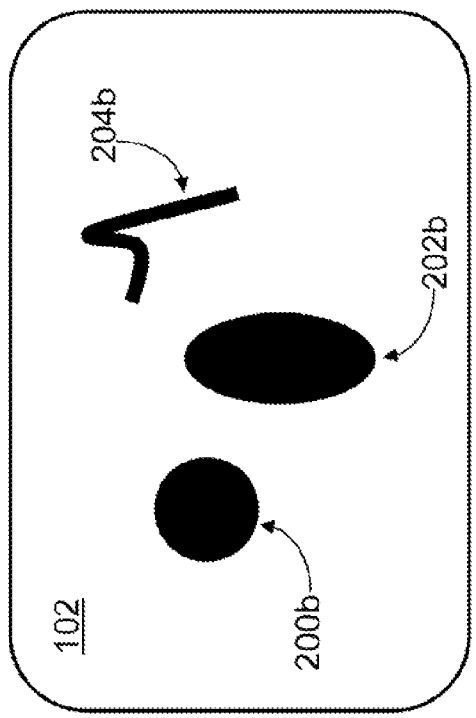
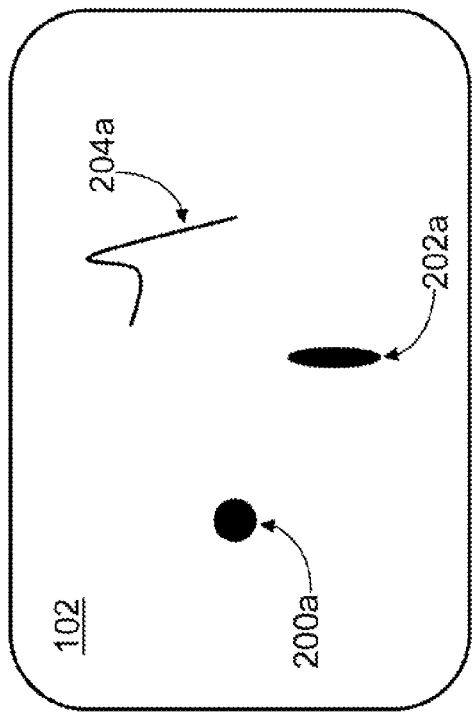

412 Choose a user-interface action to perform, the choice based, at least in part, on the classification of the touch as a "hard press," "swipe," or "tap."

USING PRESSURE DIFFERENCES WITH A TOUCH-SENSITIVE DISPLAY SCREEN

CROSS-REFERENCE TO RELATED APPLICATIONS

The present application is related to the patent application with Motorola PCT/US12/52612, filed on an even date herewith.

FIELD OF THE INVENTION

The present invention is related generally to personal electronic devices and, more particularly, to user interfaces for touch-sensitive display screens.

BACKGROUND OF THE INVENTION

Touch-sensitive display screens are a well known component of many personal electronic devices. By noting and responding to a user's touch (usually with a finger or a stylus), these screens both gather user input and present the device's output in a unified way that is very appealing for many applications.

The first popular touch-sensitive display screens could only reliably note one touch location at a time. In the presence of multiple simultaneous touches, these display screens would become confused and unpredictable. Now, however, many devices incorporate screens that reliably track several simultaneous touches and can measure the total pressure exerted by the user.

One of the appealing aspects of touch-sensitive display screens is that they can, in some instances at least, replace both the keyboard and the pointing device (e.g., a mouse or trackball) found on the more traditional personal computer. This makes these screens especially useful for very small devices such as smart phones where a keyboard, if present at all, is too small to be optimal for ten-finger typing.

Naturally, the development of user-interface modalities for touch-sensitive screens has followed the uses pioneered by the fixed keyboard and mouse. People very easily transition from using a mouse to control a cursor on the display screen to simply touching the screen and dragging the cursor where it is needed.

BRIEF SUMMARY

The above considerations, and others, are addressed by the present invention, which can be understood by referring to the specification, drawings, and claims. According to aspects of the present invention, the ability of some modern touch-sensitive screens to respond to differences in pressure is used to enhance a device's user interface. The user selects one type of user-interface action by "lightly" touching the screen and selects another type of action by exerting more pressure. For example, a light touch can be interpreted as a traditional "single click" from a mouse button, while a firmer touch can act as a "double click." In another example, within a drawing application, the user draws with a light touch and erases with a heavier touch.

Some touch-screens reliably report on a range of user pressures. Embodiments of the present invention can take advantage of this range by allowing the user to select three or even more distinct actions depending upon exactly how firmly he presses against the screen. For example, if the user is fast-forwarding through a media presentation, the speed of the fast-forwarding can vary directly with the amount of pressure exerted.

Aspects of the present invention are not limited to single-touch modalities. Instead, embodiments can respond to single touches, to gestural touches that extend across the face of the touch-sensitive screen, and to touches in which the user-exerted pressure varies during the course of the touch. Some embodiments respond to how quickly the user changes the amount of pressure applied.

In some embodiments, the location and pressure of the user's input are compared against a stored gesture profile. Action is taken only if the input matches "closely enough" to the stored gesture profile. For example, a user signs his name, and the signature is then compared against a stored signature profile. The user is given access to controlled information if the signatures match.

In some embodiments, a notification is sent to the user when the pressure exceeds a threshold between a light and a heavy press. For example, an icon can be shown on the screen when the pressure is heavy. (This is similar to the "CAPS LOCK" icon sometimes shown in conjunction with a traditional keyboard.) A sound could also be played, or haptic feedback (a "buzz" felt by the user) given.

Various touch-sensitive screens embody various technologies, and thus they differ in how they measure and report different pressures. Aspects of the present invention work with any pressure-sensing screen. In particular, some screens report a series of datapoints during a touch, each datapoint including, for example, an amplitude related to the instantaneous pressure and a size associated with the touch. In some embodiments of the present invention, this series of datapoints is monitored until the series of datapoints becomes stable, by some measure. Once the datapoints become stable, the values of the stable datapoint (called the "baseline") are used with future datapoints to determine the pressure associated with the touch. This method "stabilizes" the touch input and presents a more consistent user-interface experience.

BRIEF DESCRIPTION OF THE SEVERAL VIEWS OF THE DRAWINGS

While the appended claims set forth the features of the present invention with particularity, the invention, together with its objects and advantages, may be best understood from the following detailed description taken in conjunction with the accompanying drawings of which:

FIGS. 2a and 2b are stylized representations of a touch-sensitive screen responding to different pressures;

DETAILED DESCRIPTION

Figure 1:
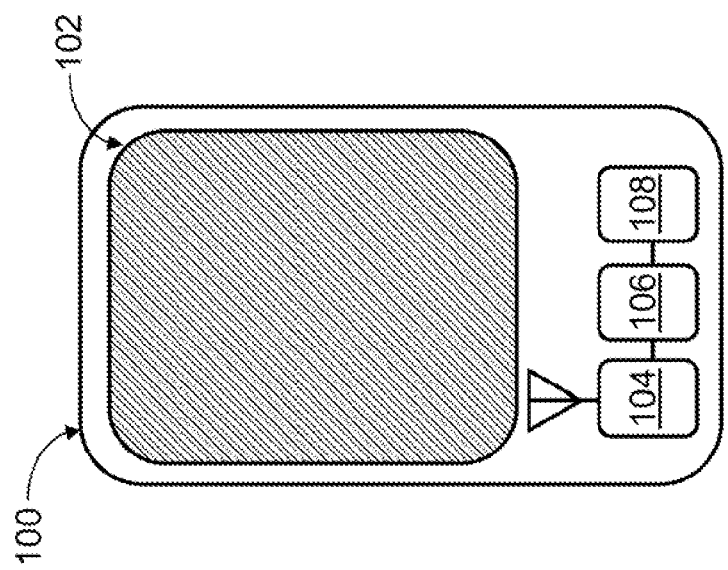
FIG. 1 is a schematic of an exemplary personal electronic device usable with the present invention.

Turning to the drawings, wherein like reference numerals refer to like elements, the invention is illustrated as being implemented in a suitable environment. The following description is based on embodiments of the invention and should not be taken as limiting the invention with regard to alternative embodiments that are not explicitly described herein.

FIG. 1 shows a representative personal electronic device 100 (e.g., a cellular telephone, personal digital assistant, or personal computer) that incorporates an embodiment of the present invention. FIG. 1 shows the device 100 as a cellular telephone presenting its main screen 102 to its user. Typically, the main screen 102 is used for most high-fidelity interactions with the user. For example, the main screen 102 is used to show video or still images, is part of a user interface for changing configuration settings, and is used for viewing call logs and contact lists. To support these interactions, the main screen 102 is of high resolution and is as large as can be comfortably accommodated in the device 100. In some situations, it would be useful for the user to have access to a screen even larger than the main screen 102. For these situations, a larger external display can be connected to, and controlled by, the electronic device 100 (e.g., through a docking station). The device 100 may have a second and possibly a third screen for presenting status messages. These screens are generally smaller than the main screen 102. They can be safely ignored for the remainder of the present discussion.

The screen 102 is a touch-sensitive screen. When the user of the device applies pressure to the screen 102 at one point or at multiple points, the screen 102 reports the locations of the touches. The pressure associated with a touch is also reported. In some devices, the screen 102 itself includes pressure sensors and can measure the pressure applied at each point. In other devices, separate pressure sensors (not shown) report either localized pressure measurements or the total amount of pressure applied to the screen 102 as a whole. To cover all of these cases without using excessive language, the present discussion uses the shorthand phrase "the screen 102 reports the pressure" regardless of which components on the device 100 actually measure and report the pressure.

Note that the present invention also applies to touch-sensitive screens that are not touch-sensitive display screens, such as touch-pads that do not have a display function. These are becoming less common today, and the present discussion focuses on examples that are touch-sensitive display screens.

Today, various technologies are being used to implement touch-sensitive screens 102. The present invention is intended to work with all existing, and any future-developed, touch-sensitive technologies.

The typical user interface of the personal electronic device 100 includes, in addition to the touch-sensitive screen 102, a keypad and other user-input devices. The keypad may be physical or virtual, involving virtual keys displayed on the touch-sensitive screen 102. Some devices 100 include an audio output and a haptic device for notifying the device's user.

FIG. 1 illustrates some of the more important internal components of the personal electronic device 100. The network interface 104 sends and receives media presentations, related information, and download requests. The processor 106 controls the operations of the device 100 and, in particular, supports aspects of the present invention as illustrated in FIGS. 3 through 7, discussed below. The processor 106 uses the memory 108 in its operations. Specific uses of these components by specific devices are discussed as appropriate below.

FIG. 2a shows how the touch-sensitive screen 102 responds to a number of touches of moderate pressure. The black areas 200a, 202a, and 204a represent where the user has pressed hard enough to register on the screen 102. (There is no requirement that these areas 200a, 202a, and 204a are displayed to the user of the screen 102 in any way.) The circular area 200a may be the result of a stylus tip or the user's finger tip. Area 202a is more elongated, possibly the result of the stylus or finger pushing down at an angle. 204a is a trace that extends through time. This could be interpreted as a "drag" motion or a gesture, depending upon the software that responds to the output of the screen 102.

In some embodiments, the screen 102 reports on the actual spatial extent of each of the touches 200a, 202a, and 204a. In these embodiments, FIG. 2a is a literal display of what is reported by the screen 102. In other embodiments, the screen 102 reports the pressure exerted, but does not report the actual area of the touch. For example, the touch 200a may be reported as a single point on the screen 102 associated with a specific amount of pressure. In these embodiments, FIG. 2a should be taken as a suggestive, rather than as a literal, representation of what the screen 102 reports.

In FIG. 2b, the touches of FIG. 2a are repeated but at higher pressures. The circular touch 200a has expanded with greater pressure to the circular area 200b. With greater pressure, the elongated touch 202b is not only larger in area, but has changed its shape, becoming somewhat less elongated with the greater pressure. The trace 204b has the same starting and ending points as the trace 204a, but the width of the trace 204b is much larger because of the greater pressure. In the screen embodiments that do not actually report on the area of the touch, trace 204b is reported with the same location (through time) as trace 204a, but with larger associated pressure values.

Figure 3A:
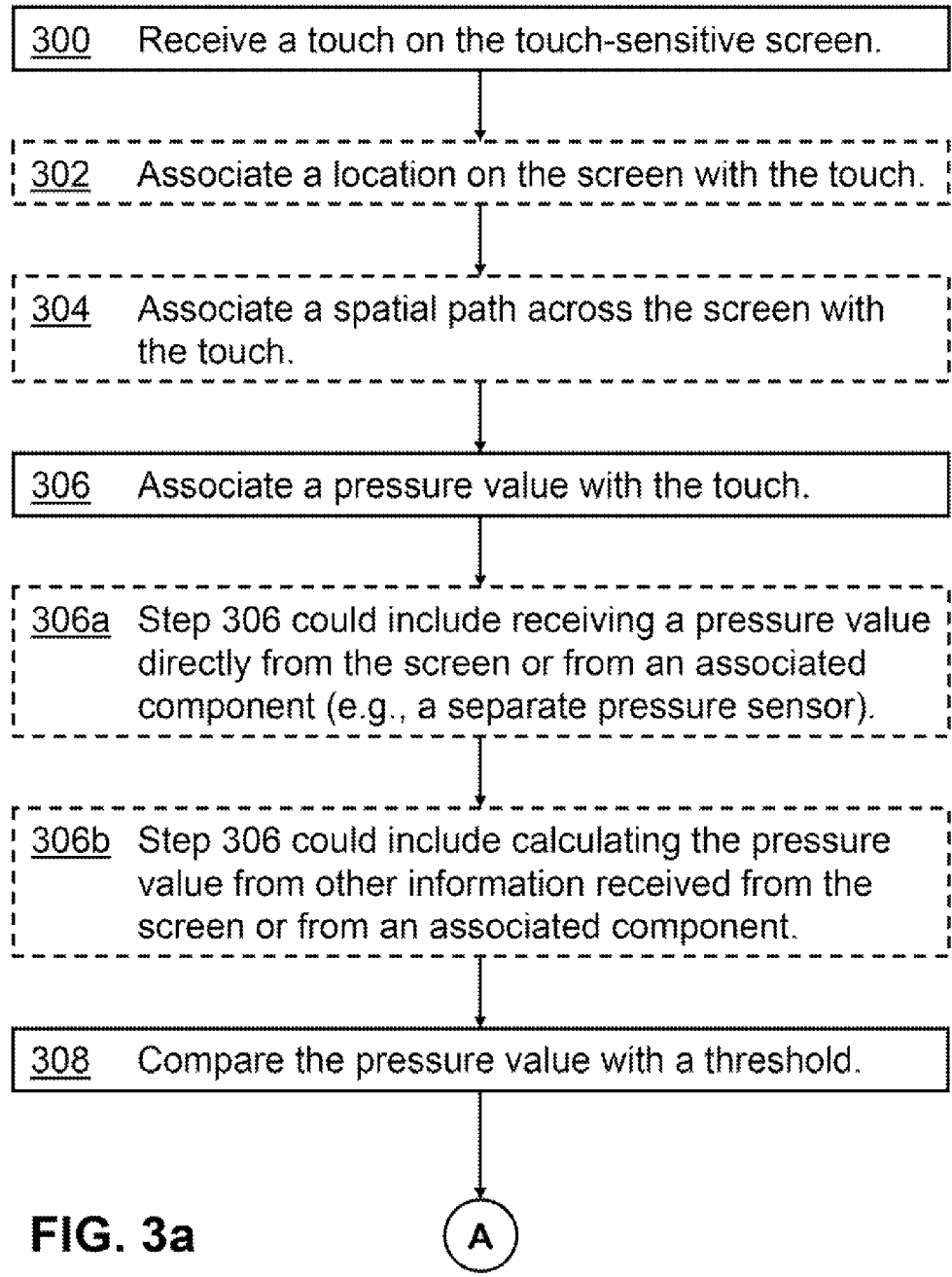
FIGS. 3a and 3b together form a flowchart of a first exemplary user interface that takes advantages of pressure reporting by a touch-sensitive screen.
Figure 3B:
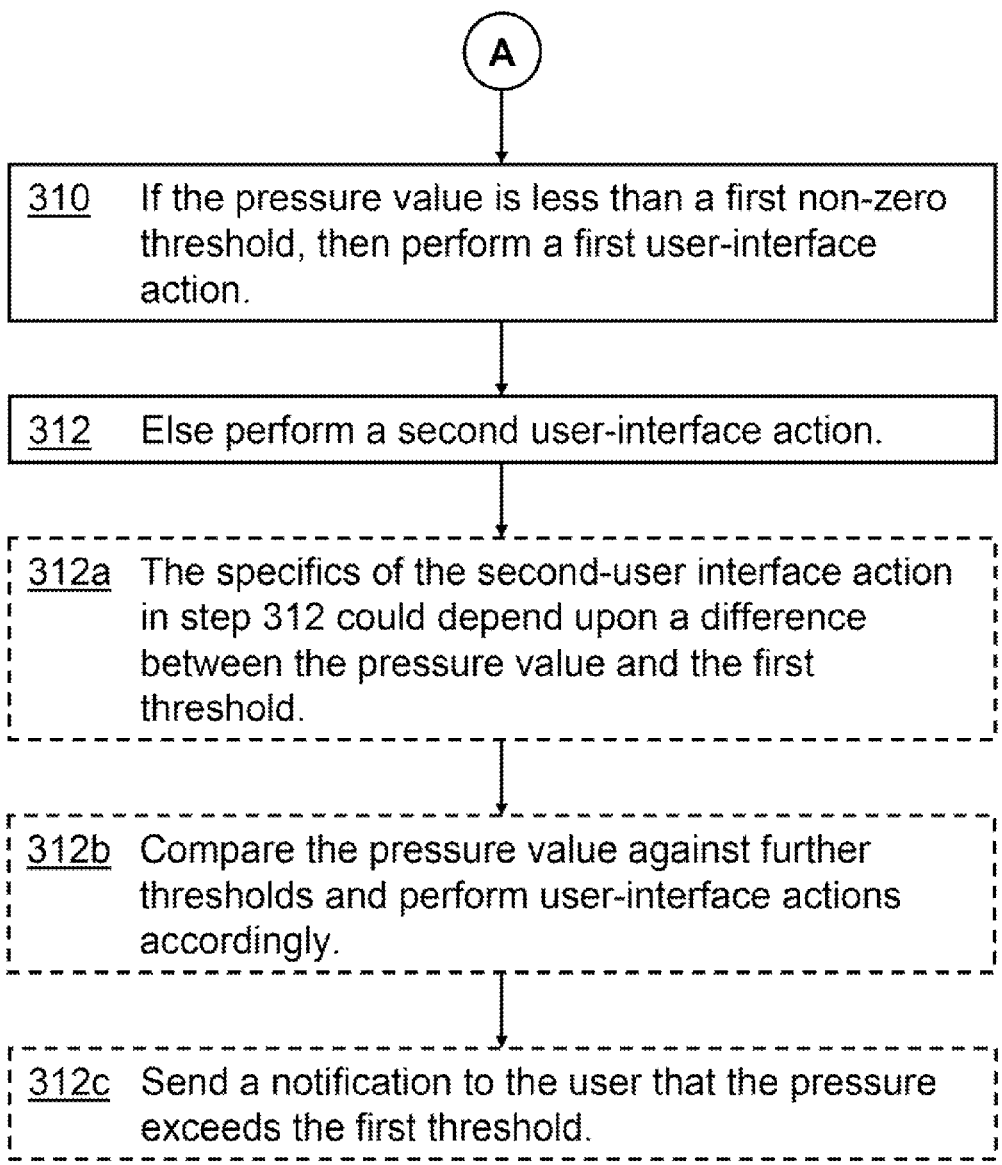

FIGS. 3a and 3b present a first exemplary method for using the pressure information provided by the touch-sensitive screen 102 in a user interface. In step 300 of FIG. 3a, the processor 106 of the personal electronic device 100 receives information about a touch on the screen 102. The present discussion naturally focuses on pressure information associated with the touch, but, as is traditional, information about the touch generally includes at least one location of the touch (step 302). For a gestural touch such as the trace 204a in FIG. 2a, the touch information includes the spatial path across the screen (step 304). (The spatial path is generally reported as a series of touched locations.)

Mention of the trace 204a of FIG. 2a makes this a good point to discuss what can be meant by a "touch." The trace 204a can be considered to be one touch that extends through space and time. Alternatively, the trace 204a can be thought of as a long series of touches, one right after the other, each touch associated with particular point on the touch-sensitive screen 102 and associated with one particular moment in time. The distinction can be important in the present discussion when the user begins by pressing down with one pressure value and then, without releasing the pressure entirely, changes to a different pressure value. Some user interfaces consider this to be a single touch whose pressure changes with time, while other user interfaces consider this to be at least two touches temporally adjacent, each with a constant pressure value. Different definitions that divide a user's gesture into one or more "touches" can be significant in understanding what signals the user is sending, but the present invention works with any such definition.

In step 306, a pressure value is associated with the received touch information. There are many ways this can be accomplished, and the differences between them are usually based on the different technologies that can be used in embodying the touch-sensitive screen 102.

Step 306a covers those cases where the screen 102 itself reports the pressure value. When a touch covers more than a single point on the screen 102, then some screens 102 report on the pressure value of each point in the touch. Other screens 102 may simply give a total, or an average, pressure value for the touch. A trace like 204a in FIG. 2a could include a long list of individual pressure values, one for each point along the trace.

Step 306a also covers the cases where a component (e.g., a pressure sensor) associated with the touch-sensitive screen 102 reports a pressure value. In a very simple case, the entire screen 102 can rest on a piezoelectric pressure sensor. When the screen 102 is touched, the pressure sensor reports the total amount of pressure exerted. This very simple system could not, of course, report the pressure exerted at each point of a touch that extends in space. In another example, a "smart" stylus measures the pressure that the user is exerting and reports that information to the personal electronic device 100. In general, the stylus only reports total pressure.

Step 306b covers those cases where the pressure associated with the touch is not directly reported, but enough information is given that the pressure can be calculated. Some touch-sensitive screens 102 report the number of "points" that are included in the touch. This is the area of the screen 102 that has received enough pressure to register a touch. For these screens 102, the light touch 200a of FIG. 2a and the heavy touch 200b of FIG. 2b are distinguished by the fact that the area affected by the heavy touch 200b is larger. In some screens 102, the area is reported as the number of channels (or points) affected by the touch. Some screens 102 report a stronger signal that is in some manner proportional to the pressure of a touch. If a screen 102 reports both the area of the touch (or the number of channels affected) and a signal proportional to the total pressure, then the average pressure can be calculated by comparing these two values. Thus, a very light touch over a large area of the screen 102 is distinguished from a heavy touch concentrated in a small area, although the total pressure received by the entire screen 102 could be the same in these two cases.

It should be noted that, for many technologies, the pressure reported is a relative value rather than an actual value of newtons per square meter. The present invention works perfectly well with either actual or relative pressure measurements.

Indeed, the pressure value associated with the touch in step 306 could be selected from the group: "above a threshold" and "below a threshold." Of course, a touch-sensitive screen 102 can also report on a zero pressure value if queried (i.e., "no detected touch at the moment"), but in that case the method of FIGS. 3a and 3b would not be invoked.

In step 308, the pressure associated with the touch is compared against a non-zero threshold. (The threshold is non-zero because the present invention distinguishes between light and heavy touches, and a zero threshold would simply distinguish between a touch and a no-touch.) Note that the actual threshold value can vary with the application that will process the touch (in steps 310 and 312 of FIG. 3b). However, the use of a consistent threshold is recommended so that users can acquire a "feel" for how much pressure to exert to cross the threshold.

The simplest embodiment of a user interface includes only steps 310 and 312 of FIG. 3b. In short, if the pressure is below the threshold, then one action is performed (step 310), otherwise a different action is performed (step 312). The user-interface actions could include, for example, selecting an icon displayed on the touch-sensitive screen 102, opening a file associated with an icon displayed on the screen 102, executing a program associated with an icon displayed on the screen 102, and modifying a value of a control parameter. As a specific example, if a drawing application is currently responding to the touch, then the drawing application could respond to a touch below the threshold by drawing on the screen 102, while a heavier touch could erase what was already drawn.

As another example, the touch could be sent to a media-playback application. A light touch on a fast-forward icon would fast-forward through a media presentation at a first speed, while a heavy touch would fast-forward through the presentation at a faster speed. If the pressure associated with the touch in step 306 of FIG. 3a is more informative than simply "above the threshold" or "below the threshold," then this two-speed fast-forward control could be refined, in step 312a by making its response proportional to the difference between the associated pressure and the threshold. That is to say, rather than simply switching between two speeds, the speed could keep increasing as the user presses harder and harder. Of course, this type of pressure-sensitive control could easily be combined with known techniques for increasing the speed as the user keeps the control pushed down. This example begins to show the real advantages of the present invention as user-interface designers are given possibilities beyond those traditionally associated with touch-sensitive screens.

Some embodiments, rather than linearly increasing the response with increased pressure, may simply include at least one more non-zero threshold (step 312b). This would turn the two-speed fast-forward control in the example above into a three-speed control, etc.

In any embodiment, the user-interface designer may choose to implement step 312c where a notification is given to the user that his pressure has crossed the threshold. For example, an icon could be shown on the touch-sensitive screen that the pressure is greater than the threshold, a sound could be played, or, possibly most usefully, a haptic response could be given that mimics the feedback encountered when a physical button is pressed down harder and harder against its spring. Different user interfaces will likely implement different notifications.

Note that in the examples given above, there is no a priori logical connection between the pressure exerted and the user-interface action chosen. To illustrate this point by a counter example, in a drawing application, the user's touch is graphically represented on the touch-sensitive screen 102: A line is displayed on the screen 102 when the user creates a trace, such as the trace 204a of FIG. 2a. Because a physical brush paints a broader line when pressed harder, it would be logical for the drawing application to display a wider line when the pressure is heavy, as in trace 204b of FIG. 2b. In this example, therefore, there exists in the user's mind an a priori logical connection between the pressure exerted and the width of the trace shown on the screen 102. However, as previous examples show, the present invention is in no way limited to these a priori logical implementations.

The discussion above is meant to be very general and to cover many possible embodiments. For a concrete example, consider the method illustrated in FIGS. 4a and 4b. The method begins with step 400 of FIG. 4a. This step 400 emphasizes that a real-world touch may extend through time and space (on the touch-sensitive display screen 102). In this case, the screen 102 sends periodic messages (or is periodically queried by the processor 106), and the result is a string of location values and associated pressures. That is, step 400 introduces a processing loop (through step 408) that continues as long as the touch continues. Generally, the touch is considered to be complete, and the loop exits to step 410, when the pressure value reported from the screen 102 falls to zero.

As information about the touch is received, the processor 106 evaluates that information beginning in step 402. Here, a pressure value is associated with the touch at the current moment. The discussion above of step 306 of FIG. 3a applies here as well. The current pressure value is compared against a pressure threshold in step 404.

The processor 106 keeps track of the distance covered by the touch. In general, the processor 106 calculates this distance from the periodic touch-location reports. In step 406, the total distance currently associated with the touch is compared against a distance threshold. If the distance threshold is exceeded, and if this touch has not already been classified as a "hard press" (see step 408), then this touch is classified as a "swipe."

Similarly, in step 408, the current pressure is compared against a pressure threshold (as in step 308 of FIG. 3a, discussed above). If the pressure threshold is exceeded, and if this touch has not already been classified as a "swipe" (see step 406), then this touch is classified as a "hard press."

The processing loop (steps 400 through 408) continues for the duration of the touch. When the touch is complete, if the touch has not been otherwise classified, the touch is classified as a "tap" in step 410.

The result of steps 406 through 410 is that every touch is classified as exactly one of "hard press," "swipe," and "tap." Of "hard press" and "swipe," the first one triggered (by exceeding the appropriate threshold) trumps the other one. For example, once a touch is classified as a "hard press," it cannot become a "swipe." If neither threshold is exceeded, the default classification is "tap." Clearly, other implementation choices using these three classifications are possible.

Figure 4A:
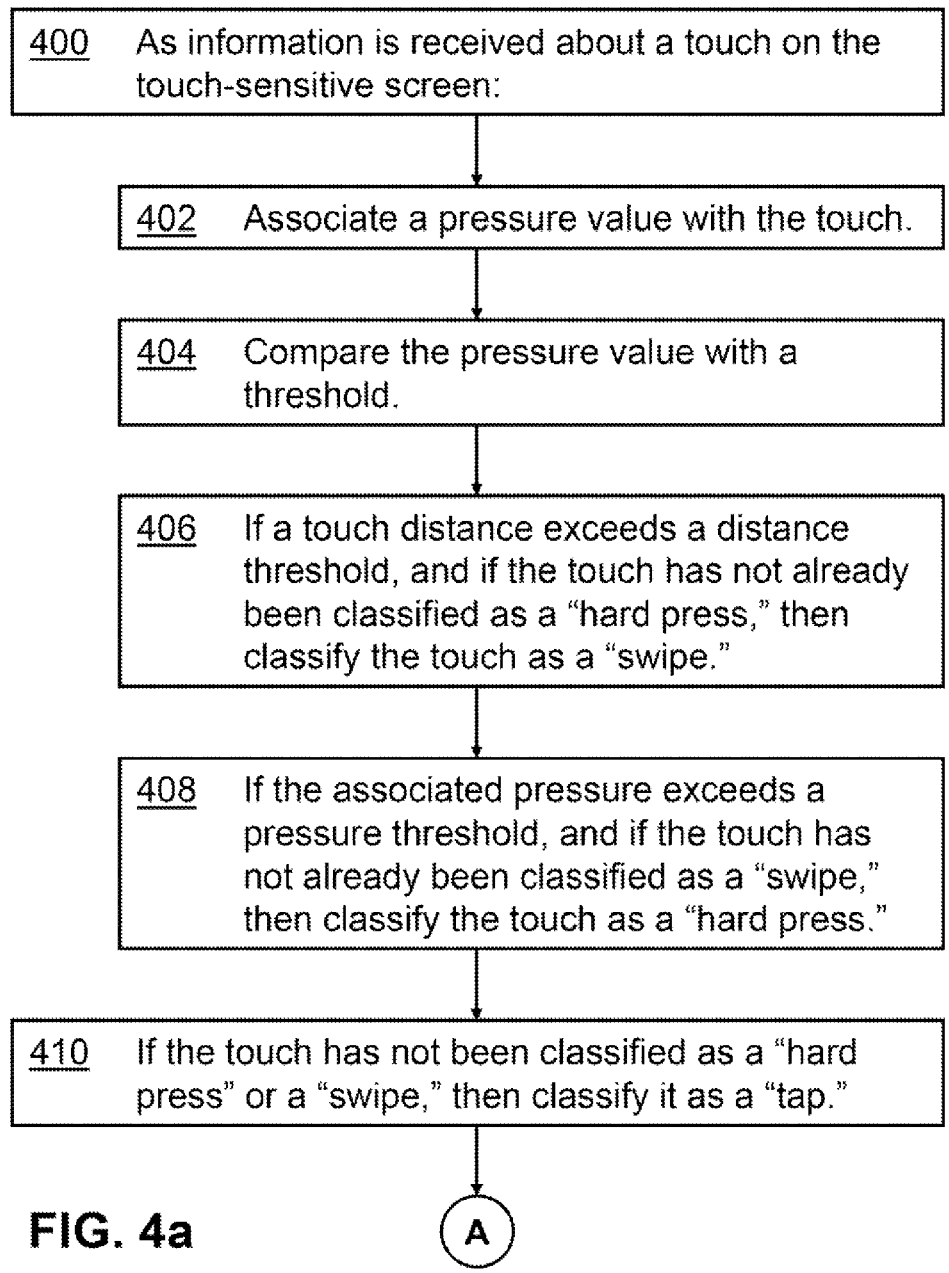
FIGS. 4a and 4b together form a flowchart of a particular embodiment of the user-interface method of FIGS. 3a and 3b.
Figure 4B:

Finally, in step 412 of FIG. 4b, a user-interface action is triggered by the touch, and the specific action is based on the classification of the touch. Note that in many cases, the action of step 412 does not have to wait until the touch is completed. Once a touch is classified as a "hard press," for example, it cannot be reclassified as either a "swipe" or a "tap," so the user interface can take the appropriate action even before the touch is completed.

As an example of this point, consider the trace 204b of FIG. 2b. Assume that the user begins the trace 204b by pressing down hard enough to exceed the pressure threshold. Then, this trace 204b is classified as a "hard press" (step 408 of FIG. 4a). In one embodiment, the triggered user action (step 412 of FIG. 4b) is a "drag and drop." A screen icon located at the beginning of the trace 204b is "grabbed" as soon as this trace is classified (step 408), is moved along the path of the trace 204b, and is then set down when the trace 204b ends.

Figure 5:
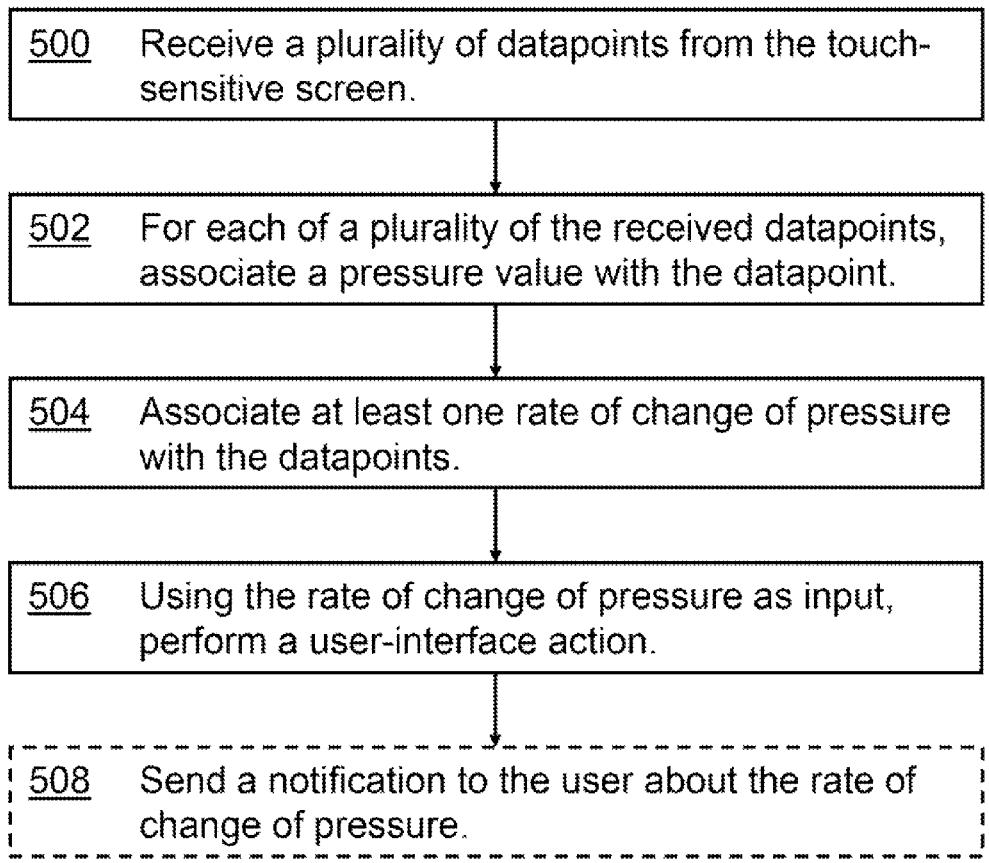
FIG. 5 is a flowchart of an exemplary user interface that responds to a rate of change of the touch pressure.

FIG. 5 presents a refinement that can be used along with the previous examples. Those previous examples all monitor touch pressure; the method of FIG. 5 also monitors the time rate of change of the pressure value. The method begins in step 500 where "datapoints" are received from the touch-sensitive screen 102. (Datapoints are not a departure from the previous methods: They are simply another way of explaining the relationship between the screen 102 and the user interface.) Just as with the extended touch of FIGS. 4a and 4b, the method of FIG. 5 begins with a loop that continues for the duration of the touch. In step 500, the screen 102 periodically reports on the touch location.

In step 502, pressure values are associated with at least some of the datapoints. This step is similar to step 306 of FIG. 3a and step 402 of FIG. 4a.

Step 504 is new with the present method. A rate of change of the pressure is associated with the set of received datapoints. Generally, the processor 102 calculates the rate of change by mapping the associated pressures of step 502 with the timestamps of the datapoints (from step 500). This rate of change is then used in step 506 as input to the user interface. As just one example, a certain user-interface action could be triggered only if the user very quickly increases the pressure of the touch.

Optional step 508 notifies the user of the rate of change of pressure. This is similar to notifying the user that the pressure has exceeded a threshold (step 312c of FIG. 3b), but, to be honest, it is believed that a notification is of less value for indicating the rate-of-change than it would be for indicating the switch between light and heavy pressure.

Figure 6:
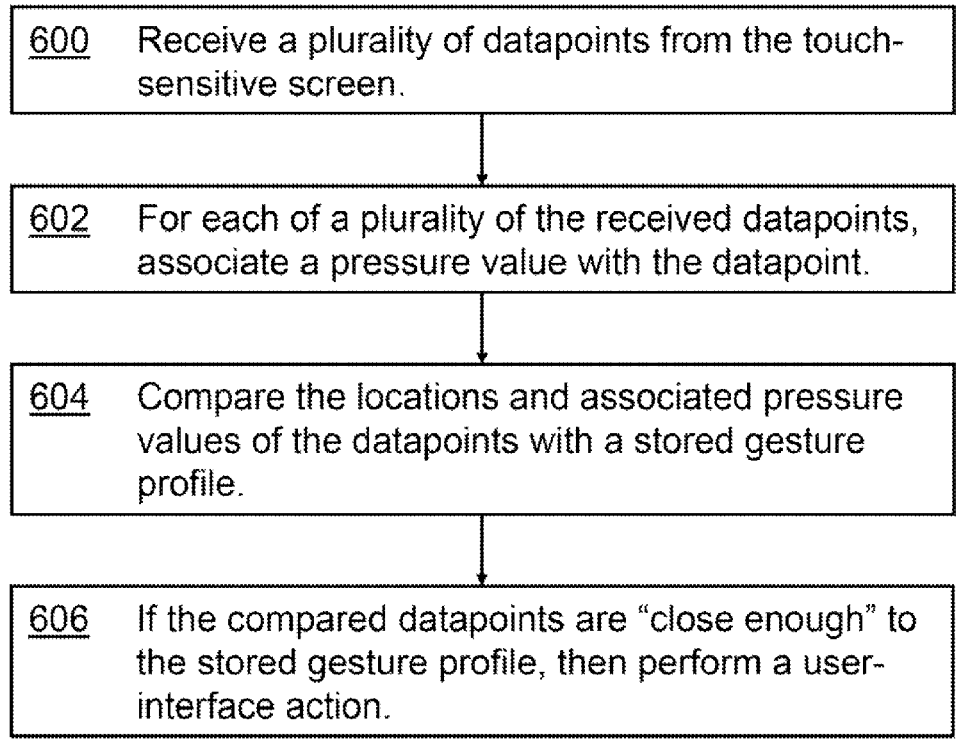
FIG. 6 is a flowchart of an exemplary user interface that uses the teachings of the present invention to compare a user's touch input with a stored gesture profile.

A final concrete example suffices to complete the present discussion. FIG. 6 presents a user-interface method that builds on the capabilities discussed above. This method analyzes an extended touch, as do some of the previously discussed methods. The processing loop begins with step 600 where datapoints are received from the touch-sensitive screen 102. Pressure values are associated with the datapoints in step 602. These two steps mirror steps 300 and 306 of FIGS. 3a, 400 and 402 of FIG. 4a, and steps 500 and 502 of FIG. 5.

Then in step 604, the datapoint information is compared against a stored gesture profile. For example, the pressure and location of each datapoint (or, more likely, of representative datapoints) are compared against analogous datapoints in the stored gesture profile.

The stored gesture profile could, for example, be created from having the user sign his name on the touch-sensitive screen 102 a number of times. A profile is generated that characterizes his signature, using both location and pressure information. In one embodiment, the signatures are compared, and only the most stable parts are represented in the profile. The profile could include very specific threshold information that shows exactly how much this user varies the positioning and pressure information when signing his name. The techniques of FIG. 5 could also be applied to the stored gesture profile by storing rate of change of pressure along with the location and pressure value information.

In step 606, if each of the comparisons is within a threshold (or if a pre-defined percentage of the comparisons are within the threshold), then the set of received datapoints is taken as a match of the stored gesture profile. Continuing with the example of the signature, the user could be prompted to sign his name. His signature is the touch received and analyzed in steps 600 through 606. If his current signature matches the stored gesture profile, then he is authenticated and could be given access to controlled information. The method of FIG. 6 thus provides a level of password security that is much more difficult to compromise than the standard text-entry mechanisms and that is even better than standard signature-based (that is, purely location-based) security mechanisms.

The method of FIG. 6 can be used to recognize and verify any gestures made by the user. This method can, for instance, improve the reliability of a handwriting-recognition program.

The examples given above illustrate that the actual actions performed are chosen by the designer of the user interface, and the pressure value is simply a signal sent by the user of the personal electronic device 100 to the user interface.

While the above methods work well, they can all be refined based on studies of how people actually interact with the touch-sensitive screen 102. It has been found that a typical user will often unwittingly change the characteristics of a touch during the course of the touch. The user may, for example, slightly alter the amount of pressure he is exerting, or he may rotate his finger so that a "squishy" portion of the finger (e.g., the pad of the finger) touching the screen 102 is replaced by a "less squishy" area (e.g., the actual tip of the finger) or vice versa. The screen 102 reflects these user changes by reporting varied values of pressure and touched area. However, these unwitting changes are not significant from a user-interface point of view, and strictly following these changes would produce an interface experience that seems vague and uncertain to the user. It would be better to "stabilize" the touch input by smoothing out these unwitting changes.

Figure 7:
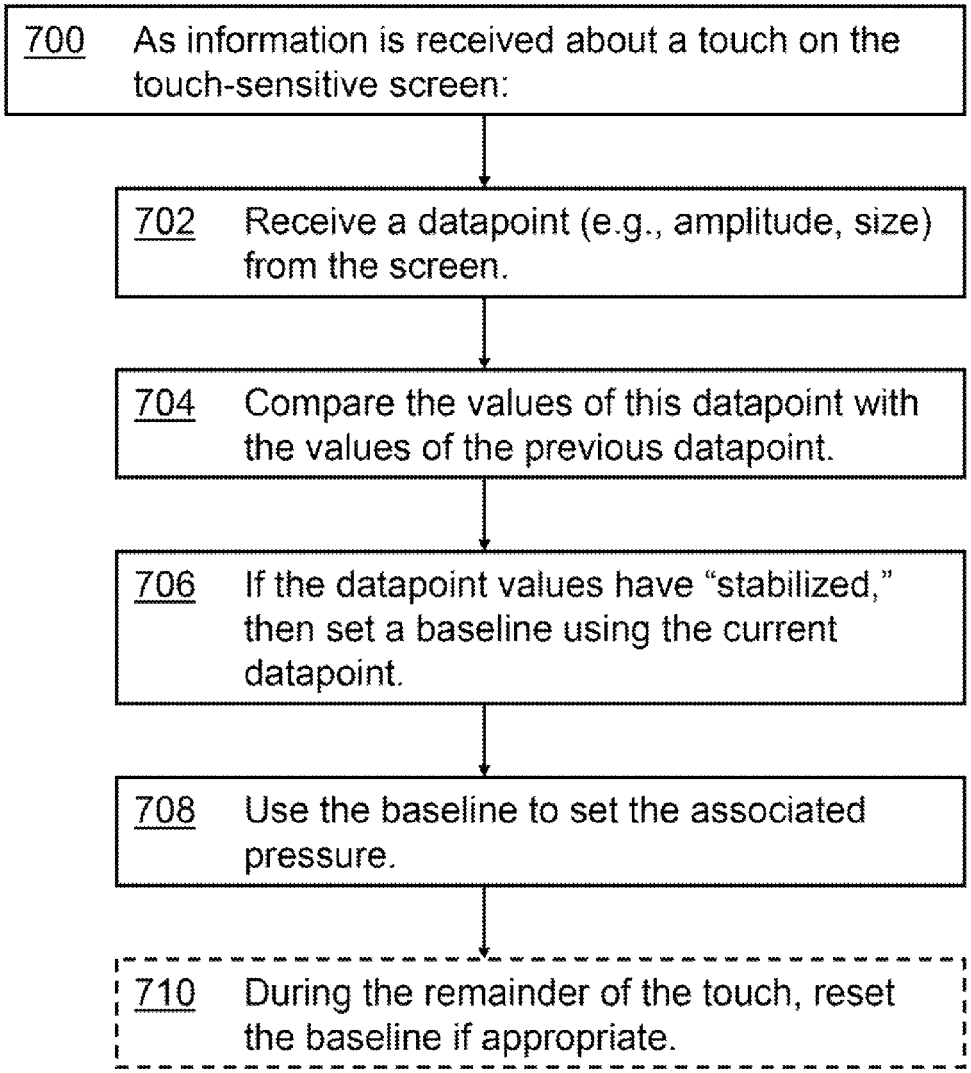
FIG. 7 is a flowchart of an exemplary method for "stabilizing" the pressure input from a touch-sensitive screen.

FIG. 7 presents a method for doing just that. The method of FIG. 7 can be seen as a refinement of step 306 of FIG. 3a, that is, a refined method of associating a particular pressure value with the touch.

The processing loop of FIG. 7 begins in step 700 which emphasizes that the touch extends through time. (As with the example of FIG. 4, the processing loop continues until the pressure value reported by the touch-sensitive screen 102 falls to zero.)

In step 702, the touch-sensitive screen 102 reports on its instantaneous state by sending a datapoint. As discussed above in reference to step 306b of FIG. 3, in some embodiments the datapoint includes an amplitude value (in some manner proportional to the pressure of the touch) and a size (in some manner proportional to the area of the screen 102 that has received enough pressure to register a touch). The size could be the area of the touch (possibly expressed in the number of points on the screen 102 that register the touch) or a linear dimension related to that area (e.g., the width or diameter of the touched area). (As discussed above, the datapoints generally also include touch-position information, but that information is not relevant to the present discussion).

Step 704 compares values of successive datapoints against one another. It is expected that a typical touch begins with a small pressure amplitude as the user's finger (or stylus) first touches the touch-sensitive screen 102. The pressure ramps up quickly to the value intended by the user and then stays at a roughly constant value. To accommodate this typical touch pattern, the comparison of successive values continues until a variation in the values satisfies a pre-defined "stability" criterion. Some embodiments use both the amplitude and the size in these comparisons, while other embodiments use only one of the values. One criterion could be that the amplitude values of successive datapoints are equal to each other, or that they differ by only a tiny amount. Another criterion could be that the amplitudes, rising from the beginning of the touch, start to decline. The size values could also be compared using similar criteria.

In any case, once the variation in the series of datapoints satisfies the stability criterion, the current datapoint is taken as a "baseline" datapoint in step 706.

With the baseline set in step 706, the pressure associated with the touch is set in subsequent datapoints as a function of the baseline datapoint, possibly also using values of the current datapoint (step 708). In one embodiment, for example, the associated pressure is computed as the amplitude of the current datapoint divided by the square root of the baseline size. Other calculations are possible.

This use of the baseline provides users with a more consistent "feel" for the touch interface when compared with the more straightforward technique of computing the associated pressure as a function of the currently reported amplitude and the currently reported size.

(Step 710 presents an optional refinement to the general refinement of FIG. 7. The baseline could be reset during the course of the touch if a pre-defined criterion is met. For example, if the size in a current datapoint is less than the previously set baseline size, then the baseline size is reset to the current size.)

Note that the technique of FIG. 7 can be applied to any of the above examples to "stabilize" the interface. That is, FIG. 7 can be used to refine step 402 of FIG. 4, step 502 of FIG. 5, and step 602 of FIG. 6.

In view of the many possible embodiments to which the principles of the present invention may be applied, it should be recognized that the embodiments described herein with respect to the drawing figures are meant to be illustrative only and should not be taken as limiting the scope of the invention. For example, widely different uses of the present invention are contemplated for different user interfaces and in different contexts. Therefore, the invention as described herein contemplates all such embodiments as may come within the scope of the following claims and equivalents thereof.

I claim:

1. A method comprising:
   receiving a touch on a touch-sensitive screen of a personal electronic device, wherein receiving the touch comprises receiving a series of datapoints associated with the touch, wherein each datapoint in the series of datapoints comprises a respective amplitude and a respective size;
   comparing, by the personal electronic device, values of datapoints in the series of datapoints with one another until a difference between a value of a first datapoint from the series of datapoints and a value of a successive datapoint satisfies a pre-defined criterion;
   responsive to determining that the predefined criterion is satisfied, defining a value of a baseline datapoint as equal to a value of the first datapoint;
   computing, by the personal electronic device, an associated pressure of the touch as a function of at least one of an amplitude of the baseline datapoint and a size of the baseline datapoint;
   comparing the associated pressure with a non-zero threshold;
   if the associated pressure is less than the non-zero threshold, performing a first user-interface action; and
   if the associated pressure is not less than the non-zero threshold, performing a second user-interface action distinct from the first user-interface action.

2. The method of claim 1:
   wherein the pre-defined criterion is satisfied when a difference between amplitudes of successive datapoints being compared is below a threshold.

3. The method of claim 1:
   wherein the pre-defined criterion is satisfied when a difference between sizes of successive datapoints being compared is below a threshold.

4. The method of claim 1 wherein computing the associated pressure of the touch comprises dividing one of the amplitude of the baseline datapoint and an amplitude of a current datapoint of the series of datapoints being compared by a square root of a size of the baseline datapoint.

5. The method of claim 1 wherein computing the associated pressure of the touch comprises dividing the amplitude of the baseline datapoint by one of a square root of a size of the baseline datapoint and a square root of a size of a current datapoint of the series of datapoints being compared.

6. The method of claim 1, wherein the pre-defined criterion comprises a first pre-defined criterion, the method further comprising:
   when comparing values of a current datapoint and its successive datapoint in the series of datapoints after the baseline datapoint is defined:

responsive to determining that a second pre-defined criterion is satisfied, re-defining the value of the baseline datapoint as equal to a value of the current datapoint.

7. The method of claim 6:
wherein the second pre-defined criterion is satisfied when an amplitude of the current datapoint is lower than an amplitude of the baseline datapoint.

8. The method of claim 6:
wherein the second pre-defined criterion is satisfied when a size of the current datapoint is lower than a size of the baseline datapoint.

9. The method of claim 1, wherein the pre-defined criterion is satisfied when an amplitude of a current datapoint is lower than an amplitude of a previous datapoint.

10. The method of claim 1, wherein the pre-defined criterion is satisfied when a size of a current datapoint is lower than a size of a previous datapoint.

11. A personal electronic device comprising:
a touch-sensitive screen; and
a processor operatively connected to the touch-sensitive screen and configured for:
receiving a touch on the touch-sensitive screen, wherein receiving the touch comprises receiving a series of datapoints associated with the touch, wherein each datapoint in the series of datapoints comprises a respective amplitude and a respective size;
comparing values of datapoints in the series of datapoints with one another until a difference between a value of a first datapoint from the series of datapoints and a value of a successive datapoint satisfies a pre-defined criterion;
responsive to determining that the predefined criterion is satisfied, defining a value of a baseline datapoint as equal to a value of the first datapoint;
computing an associated pressure of the touch as a function of at least one of an amplitude of the baseline datapoint and a size of the baseline datapoint;
comparing the associated pressure with a non-zero threshold;
if the associated pressure is less than the non-zero threshold, performing a first user-interface action; and
if the associated pressure is not less than the non-zero threshold, performing a second user-interface action distinct from the first user-interface action.

12. The personal electronic device of claim 11 wherein the personal electronic device is a member selected from a group consisting of: mobile telephone, personal communications device, personal computer, tablet computer, kiosk, digital sign, and gaming console.

13. The personal electronic device of claim 11 wherein the first and second user-interface actions are at least one member selected from a group consisting of: selecting an icon displayed on the screen, opening a file associated with an icon displayed on the screen, executing a program associated with an icon displayed on the screen, modifying a value of a control parameter, opening a context menu, and picking up an icon displayed on the screen.

14. The personal electronic device of claim 11:
wherein the pre-defined criterion is satisfied when a difference between amplitudes of successive datapoints is below a threshold.

15. The personal electronic device of claim 11:
wherein the first pre-defined criterion is satisfied when a difference between sizes of successive datapoints is below a threshold.

16. The personal electronic device of claim 11 wherein computing the associated pressure of the touch comprises dividing one of the amplitude of the baseline datapoint and an amplitude of a current datapoint of the series of datapoints being compared by a square root of a size of the baseline datapoint.

17. The personal electronic device of claim 11 wherein computing the associated pressure of the touch comprises dividing the amplitude of the baseline datapoint by one of a square root of a size of the baseline datapoint and a square root of a size of a current datapoint of the series of datapoints being compared.

18. The personal electronic device of claim 11 wherein the pre-defined criterion comprises a first pre-defined criterion, wherein the processor is further configured for:
when comparing values of a current datapoint and its successive datapoint in the series of datapoints after the baseline datapoint is defined:
responsive to determining that a second pre-defined criterion is satisfied, re-defining the value of the baseline datapoint as equal to a value of the current datapoint.

19. The personal electronic device of claim 18:
wherein the second pre-defined criterion is satisfied when an amplitude of the current datapoint is lower than an amplitude of the baseline datapoint.

20. The personal electronic device of claim 18:
wherein the second pre-defined criterion is satisfied when a size of the current datapoint is lower than a size of the baseline datapoint.

21. The personal electronic device of claim 11, wherein the pre-defined criterion is satisfied when an amplitude of a current datapoint is lower than an amplitude of a previous datapoint.

22. The personal electronic device of claim 11, wherein the pre-defined criterion is satisfied when a size of a current datapoint is lower than a size of a previous datapoint.

* * * * *